(12) United States Patent
Wyler (10) Patent No.: US 9,391,702 B2
(45) Date of Patent: Jul. 12, 2016

(54) SYSTEM AND METHOD FOR MULTIPLE LAYER SATELLITE COMMUNICATION

(71) Applicant: 1110 Ventures LLC, Miami, FL (US)

(72) Inventor: Gregory Thane Wyler, Sewall's Point, FL (US)

(73) Assignee: WORLDVU SATELLITES LIMITED, Jersey (*) Notice: Subject to any disclaimer, the term of this patent is extended or adjusted under 35 U.S.C. 154(b) by 191 days.

(21) Appl. No.: 13/894,994

(22) Filed: May 15, 2013

(65) Prior Publication Data
US 2014/0341586 A1    Nov. 20, 2014

(51) Int. Cl.
*H04B 10/00* (2013.01)
*H04B 10/118* (2013.01)
*H04B 7/185* (2006.01)

(52) U.S. Cl.
CPC .......... *H04B 10/118* (2013.01); *H04B 7/18521* (2013.01)

(58) Field of Classification Search
CPC ..................... H04B 10/1143; H04B 10/25758; H04B 10/25752; H04B 10/25753; H04B 10/118; H04B 7/18521; H04J 14/0298
USPC ......................................................... 398/115
See application file for complete search history.

(56) References Cited

U.S. PATENT DOCUMENTS

| | | | | |
|---|---|---|---|---|
| 5,555,257 A * | 9/1996 | Dent | ...................... | H01Q 1/246 342/352 |
| 5,678,175 A * | 10/1997 | Stuart | ..................... | H04B 7/195 244/158.4 |
| 5,722,042 A * | 2/1998 | Kimura | ................... | H04B 7/195 342/352 |
| 6,078,810 A * | 6/2000 | Olds | ....................... | H04B 7/195 455/12.1 |
| 6,226,493 B1 * | 5/2001 | Leopold | .................... | H04B 7/19 455/13.1 |
| 7,369,809 B1 * | 5/2008 | Wang | ................. | H04B 7/18521 455/12.1 |
| 2001/0013566 A1 * | 8/2001 | Yung | ...................... | H04B 7/195 244/158.4 |
| 2011/0169688 A1 * | 7/2011 | Wyler | ................... | H04B 7/2041 342/354 |
| 2014/0341586 A1 * | 11/2014 | Wyler | ................ | H04B 7/18521 398/115 |

* cited by examiner

*Primary Examiner* — Danney Leung
(74) *Attorney, Agent, or Firm* — Kaplan Breyer Schwarz & Ottesen, LLP (57) ABSTRACT

A system and method are disclosed that may include a system and method for transmitting user data from an initial satellite in a first constellation located conveniently to an origination user terminal to a destination satellite in the first constellation located conveniently to a destination user terminal, the method including transmitting the user data over an optical link from the initial satellite in the first constellation to a first satellite within a second satellite constellation; conveying the user data over an optical link from the first satellite in the second constellation to a second satellite in the second constellation; and receiving the user data from the second satellite in the second constellation at the destination satellite in the first constellation.

30 Claims, 5 Drawing Sheets

SYSTEM AND METHOD FOR MULTIPLE LAYER SATELLITE COMMUNICATION

BACKGROUND OF THE INVENTION

This application relates in general to communications and in particular to satellite communications.

Satellite communication systems provide various benefits to consumers of communication services such as telephony, internet communications, and television communications among others. Various satellite systems are currently available, which are discussed below.

Currently, satellite communication is implemented using satellites arranged in a single constellation though distributed over different planes, all having the same orbit geometry. Earth stations in the form of user terminals communicate with one or more satellites using Radio Frequency (RF) communication links. Thereafter, the satellite system communicates with another earth-based terminal which is linked in to a broader network, such as the Internet, a Cable television system, or other communication network. In this manner, an otherwise isolated user terminal can be placed in communication with a global network using a satellite system as a communication intermediary.

Current satellite communication systems suffer from the drawback that communication bandwidth is limited by the bandwidth of each satellite in the system. Additional satellites may be deployed to address this concern. However, this solution adds considerable expense to the overall system due to the cost of constructing, launching, and maintaining the operation of ever greater numbers of satellites. Limits on the availability of communication spectrum may impose a limit on the number different wavelengths that the system can communicate over at one time. Moreover, in satellite systems with large numbers of satellites that use inter-satellite communications, it is difficult for two satellites to communicate with one another where one satellite is moving northbound along one line of longitude and the other satellite is moving south along a neighboring line of longitude because the closing speed (the rate at which the satellites are approaching one another) is at a level that makes it difficult for satellites to accurately track one another at the level required for the pointing of communications links.

Accordingly, there is a need in the art for a satellite communication system that can accommodate greater communication bandwidth, and that will allow better inter-satellite communications, without imposing an undue cost burden and which can operate within the constraints imposed by the limited communication spectrum available to modern satellite systems.

SUMMARY OF THE INVENTION

According to one aspect, the invention is directed to a communication system that may include a first constellation of satellites traveling in a substantially polar orbit and operable to communicate with earth-based user terminals over respective radio frequency (RF) links; and a second constellation of satellites traveling in an inclined orbit operable to communicate with selected satellites in said first constellation over respective optical communication links.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
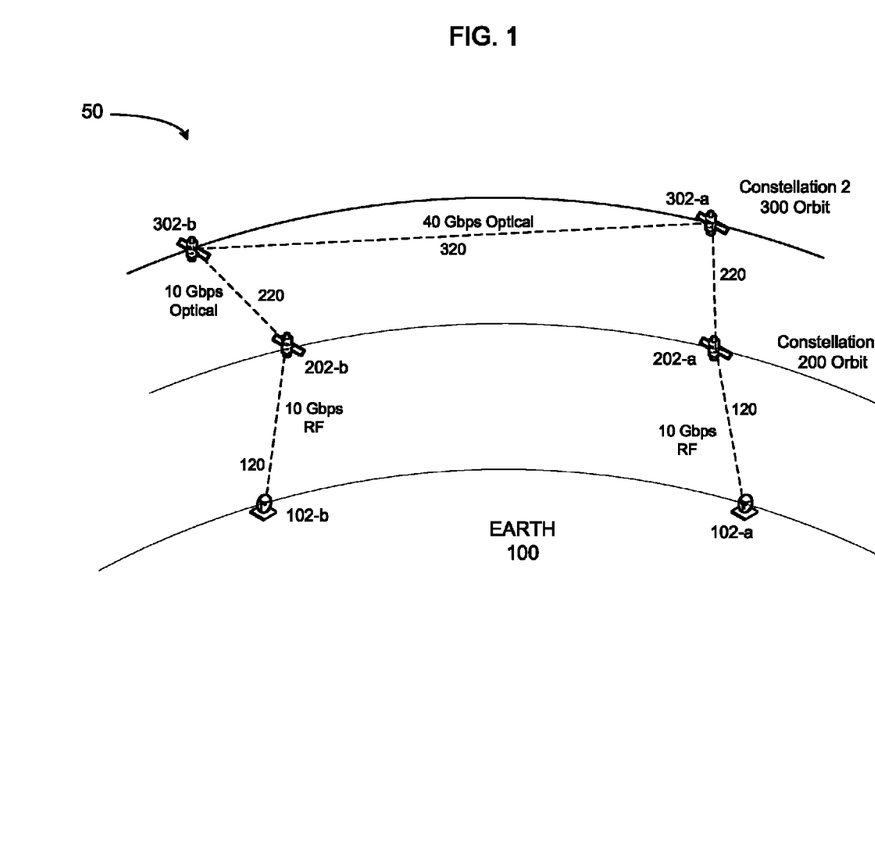
FIG. 1 is a schematic view of a multiple layer satellite communication system in accordance with an embodiment of the present invention.

FIG. 1 is a schematic view of a multiple layer satellite communication system 50 in accordance with an embodiment of the present invention. FIG. 1 is provided to provide a conceptual overview of the operation of an embodiment of the present invention. In the embodiment shown, user terminals 102-a and 102-b (collectively user terminals 102) communicate directly with satellites 202-a and 202-b, respectively, in constellation 1 200 (the RF constellation) and indirectly using constellation 2 300 (the optical constellation), thereby providing a dual-layer satellite system.

An embodiment of the present invention employs a multiple-constellation satellite system that uses RF transmission links to transmit user data through the ambient data-transmission obstructions prevalent at low altitudes, and which uses optical communication through free space to handle high-bandwidth data transmission between satellites in the RF constellation 200 in locations suitable for communication with the origination and destination user terminals 102, respectively. In this manner, an embodiment of the present invention can use RF communication for the limited purpose of piercing through data-path obstructions due to ambient conditions close to the surface of the earth (i.e. near-earth communication), but which then uses optical communication to conduct high-speed communication through free space once the user data is free and clear of the afore-mentioned data-path obstructions. The optical constellation 300 may thus be used as a high-speed communications trunk line to transmit data to a destination RF satellite 102 convenient to a destination user terminal 102, thereby alleviating data traffic congestion in the RF constellation 200.

An embodiment of the present invention enables user terminals 102 on the earth 100 to communicate directly, over RF links, with an RF constellation 200, thereby enabling the user terminal to transmit data through rain, clouds, and other weather-related obstacles due to the robustness RF communication signals. Thereafter, the RF constellation may further transmit the user data to the optical constellation 300 using an optical link. The optical constellation 300 can then convey the user data to a satellite 302 in the optical constellation 300 most convenient to the destination user terminal to which the user data is being transmitted. The data may then be transmitted back to the RF constellation 200 and in turn to the destination user terminal.

The above arrangement preferably operates to alleviate data traffic congestion within satellites 202 in the RF constellation 200 by transferring the bulk of the data traffic to the optical constellation 300. Moreover, the use of the multiple-layer satellite system (which may have two, three or more layers) may be operated in a manner that is opaque to users and user terminals 102 on the earth 100, thereby avoiding any need to alter communication protocols or addressing data to accommodate the operating characteristics of the multiple-layer satellite system.

The number of satellites deployed in each of the first constellation 200 and the second constellation 300 may be variable and scalable based on the needs of the system 50. However, in a preferred embodiment, one operating principle relating to the number of satellites 302 to be deployed within constellation 300 is that the number of satellites 302 should be sufficient to enable any satellite 202, in constellation 200, to communicate with any other satellite 202, using the satellites 302 in constellation 300 as communication intermediaries. This is essentially equivalent to saying that there should be full communication-connectivity among the satellites 202 of constellation 200. Once full communication-connectivity among the satellites 202 of constellation 200 is established, it follows that each user terminal 102 in communication with any satellite 202 will be able to communicate with any other user terminal 102, within system 50, using constellation 200 and possibly constellation 300 as communication intermediaries.

We turn now to a detailed discussion of the specific embodiment shown in FIG. 1. System 50 may include user terminals 102-*a* and 102-*b* on the earth 100; constellation 1 (the RF constellation) moving in a polar orbit at an altitude of about 950 kilometers (km) and including satellites 202-*a* and 202-*b* (collectively RF satellites 200) as part thereof; constellation 2 (the optical constellation) 300 moving in an inclined orbit at an inclination angle of about 57.5 degrees at an altitude of about 1350 km and including satellites 302-*a* and 302-*b* (collectively optical satellites 300). It is noted that the term "RF satellites" is merely a useful abbreviated term for referring to satellites 200. In the embodiment shown in FIG. 1 (among other embodiments), RF satellites 200 include both RF and optical communication ports, which will be discussed in greater detail elsewhere in this document.

It is noted that the present invention is not limited to having the constellations employ the altitudes and inclination angles mentioned herein. For instance, in alternative embodiments, the RF constellation 200 could operate any altitude between 750 km and 1000 km, and with an inclination angle between 85 degrees and 95 degrees. Moreover, in alternative embodiments, the optical constellation 300 could operate at altitudes between 1150 km and 1550 km. Moreover, the invention is not limited to using only two constellations having different orbit geometries. Otherwise stated, the invention is not limited to a satellite system having only two "layers." Specifically, three or more satellite layers could be employed. More broadly, the concept disclosed herein of using a one or more satellite constellations to conduct communication with earth-based user terminals using RF data communication links and a one or more other satellite constellations to serve as high-speed communication trunk lines may be employed with any desired combination of orbit altitudes and orbit angle inclinations (as measured with respect to the equator). Moreover, although in one embodiment satellites 302 may use optical communication alone, the invention is not limited to employing only optical communication in constellation 300, but may instead use a combination of RF and optical communication, or RF communication alone, and all such variations are intended to be included within the scope of the present invention.

Having discussed the communication devices, we now turn to the communication links. In one embodiment, communication between user terminals 102 and RF satellites 202 may occur over respective RF links 120 and may occur at a range of rates. On each RF data link 120, the data rate may be anywhere from 0 to 10 gigabits per second (Gbps). Communication between the RF satellites 202 and the optical satellites 300 may occur over optical communication links 220 and preferably at a rate of 10 Gbps. Communication between the optical satellites 300 may occur over respective optical communication links 320, preferably at a rate of 40 Gbps. It is noted that, in this embodiment, data link 320 carries data within constellation 300 at about four times the rate of the links from the earth 100 to the RF constellation 200 and the links from the RF constellation 200 to the optical constellation 300. This is because data traffic from multiple RF satellites 200 (and what may be many earth-based user terminals 102 for each such RF satellite) may be multiplexed onto the data traffic paths within constellation 300.

While various specific data communication rates were specified for the embodiment shown in FIG. 1, the present invention is not limited to the listed data rates. The RF communication may take place at a range of rates above or below 10 Gbps. Moreover, the communication between the RF satellites 202 and the optical satellites 302 may occur at rates above or below 10 Gbps. Communication occurring over data links 320, between optical satellites 302 within constellation 300, may occur at rates above or below 40 Gbps.

We now consider an example of a data communication scenario using the embodiment shown in FIG. 1. In this example, a user at user terminal 102-*a* on the earth 100 wishes to send data to user terminal 102-*b*, which for the sake of this example is presumed to very distant from user terminal 102-*a*, and thus beyond the communication range of satellite 202-*a*. User terminal 102-*a* may send its user data along link 120 to satellite 202-*a* within the RF constellation 200. Thereafter, satellite 202-*a* may further transmit the user data over optical communication link 220 to satellite 302-*a* within optical constellation 300.

Figure 3:
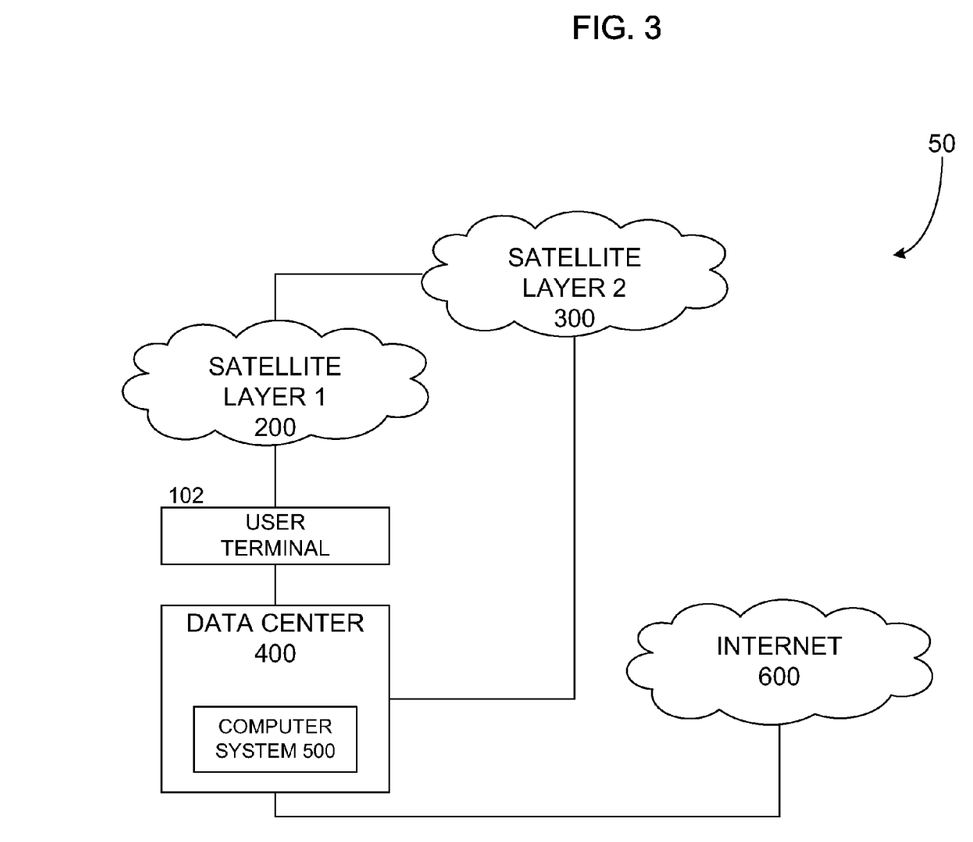
FIG. 3 is a block diagram of a data center in communication with one or more satellite constellations in accordance with an embodiment of the present invention.

For the sake of this part of the discussion, it is presumed that system 50 includes data processing equipment (an exemplary version of which is shown in FIG. 3) that is operable to identify (a) a satellite 202-*b* within constellation 200 that is most suitable for conducting the last leg of the data communication path to user terminal 102-*b*; and in turn (b) to identify the optical satellite 302-*b* most suitable for transmitting the user data along the second-to-last leg of the communication path, to satellite 202-*b*.

Upon receiving the user data, satellite 302-*b* preferably transmits the data to satellite 202-*b* in the RF constellation.

Thereafter, satellite 202-*b* preferably transmits the user data to user terminal 102-*b* on the earth 100. In one embodiment, the shift of the data communication payload from the RF constellation 200 to the optical constellation 300 may occur so as to be completely opaque to user terminal 102-*b* and a human user of user terminal 102-*b*.

Figure 2:
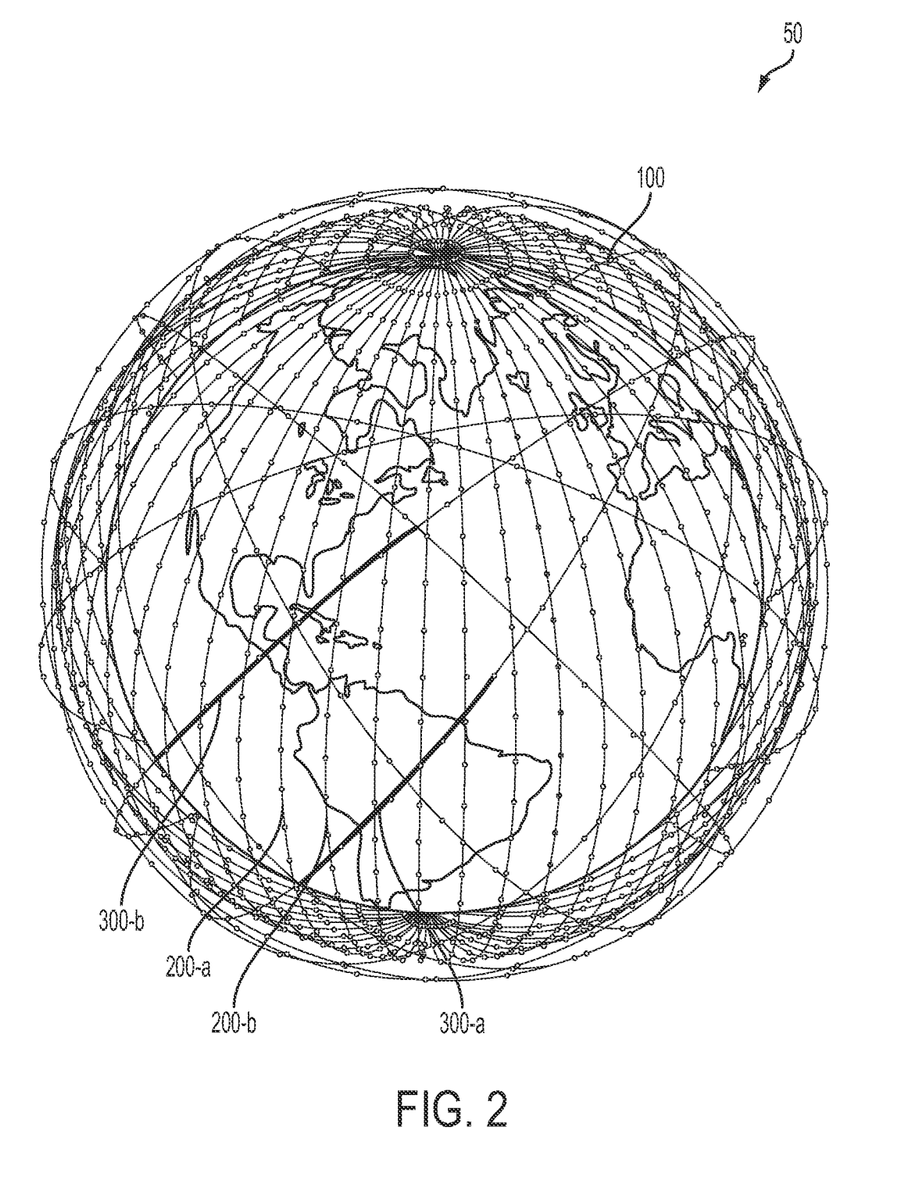
FIG. 2 is a perspective view of a plurality of satellite constellations orbiting the earth, in accordance with an embodiment of the present invention.

FIG. 2 is a perspective view of a satellite communication system 50 in accordance with an embodiment of the present invention.

FIG. 2 is a perspective view of a plurality of satellite constellations 200, 300 orbiting the earth 100, in accordance with an embodiment of the present invention. The satellites of constellation 200, which are moving along a polar orbit, are arranged along various different lines of longitude over the earth 100, with the satellites along each such line of longitude forming a sub-constellation of constellation 200. Due to space limitations, only sub-constellations 200-*a* and 200-*b* are called out with reference numerals. Satellites in constellation 300 may be distributed over several inclined planes. Due to space limitations only two such planes are called out with reference numerals in FIG. 3: 300-*a* and 300-*b*.

In one embodiment, the RF constellation 200 may include about 1250 satellites along with a few (between 50 and 100) spare satellites. The RF satellites 200 may communicate using respective RF links 120 with user terminals 102 on the earth 100, and with the optical satellites 300 over optical communication links 220.

The satellites 202 in the RF satellite constellation 200 may be about 40 cm (15.7") long, and about 13.6 cm (5.4") deep, and may weigh about 75 kilograms (kg). In one embodiment, the RF satellites 202 may have a hexagonal shape. However, the present invention is not limited to using RF satellites 202 with the dimensions and shapes discussed above.

In one embodiment, each RF satellite 202 microwave forms nineteen (19) individual beams that form coverage regions on the surface of the earth 100 having a cellular honeycomb pattern. The RF satellites 202 may be spaced to adjust the size and location of these honeycomb to achieve full earth 100 surface coverage.

With reference to FIG. 2, when traveling along a polar orbit, the satellites 202 travel along lines of longitude that are farthest apart at the equator, with overlapping coverage areas as they approach latitudes approaching the north or south poles. Overlapping coverage arising from the proximity of the coverage areas of the RF satellites 202 preferably enables greater data transmission throughput to more northerly, heavily populated areas such, but not limited to, the United States, Europe, and China.

The rate of data communication throughput is the product of the width of the frequency band available for data transmission and the number of bits per hertz. With more than 2.0 Ghz (gigahertz) of forward spectrum, embodiments of the present invention can operate using relatively low power levels to achieve efficiencies such as 1 bit/hz (one bit per hertz) or less, and still yield economically viable throughput. The use of lower power levels enables the resulting satellite design to be smaller and less expensive. Moreover, when the satellites are smaller and less expensive, it becomes possible to launch more satellites with each launching operation, and to do so at lower cost.

Each satellite has an Orbit Average Power (OAP) of approximately 180 watts. This allows the satellite to operate during the longest eclipses with the average throughput discussed above. The above may be achieved by installing a battery having energy storage suitable for providing 180 watts of power for a period of time equaling or surpassing the duration of the longest solar eclipse the satellite can experience.

Satellite Communication Ports

In one embodiment, each RF satellite 202 can route packets from any of its communication ports to any port on another satellite with which it is communicating. Satellite 202 preferably includes an internal switch that supports nineteen (19) separate RF beams and two optical ports. Otherwise stated, each RF satellite 202 serves as an Ethernet-type switch, with nineteen ports operable to communicate over RF links with user terminals 102 on the earth 100, and two optical ports operable to communicate with satellites 302 in the optical constellation 300.

FIG. 3 is a block diagram of a data center 400 in communication with the satellite constellations 200, 300 and with the Internet 600 in accordance with an embodiment of the present invention. In the embodiment of FIG. 3, system 50 may include satellite layers (constellations) 200 and 300, user terminal 102 (on the earth) which may be in communication with data center 400 (on the earth), which may in turn be in communication with the Internet 600.

Data center 400 may include a variety of computing equipment including one or more components of computer system 600, which is described in greater detail elsewhere herein. Data center 400, and one or more other data centers having comparable facilities, may be used to acquire and accumulate data concerning the operation of system 50. Moreover, data center may generate and transmit data to the various satellites 202 and 302 in constellations (layers) 200 and 300, respectively, relating to the control of energy consuming devices aboard each satellite, and/or the devices (whether ground-based user terminals or other satellites) that each satellite will communicate with, and which port on the satellite is to be used for such communication.

The control decisions relating to the selection of satellites and/or user terminals that any communication device (i.e. a satellite or user terminal) should communicate with may be conducted by a data center 400, by the device itself, or by a combination of the two. Moreover, the data acquisition and control functions of communication system 50 may be distributed over a range of computing devices on the earth 100, within satellite constellations 200, 300, or within a combination of the foregoing.

When a user terminal 102 is coupled to the Internet 600, as is illustrated in FIG. 3, the RF satellite 202 may redirect the internet traffic from data center 400 to a predetermined destination according to a predetermined data path, which is sometimes referred to in the communications industry as "bent-pipe" transmission. This could include a second user terminal 102 that is in communication with RF satellite 202, but that is not directly connected to Data Center 400. Alternatively, RF satellite 202 may transmit the data over an indirect path, that may include transmitting the data to a satellite 302 within optical satellite constellation 300, then, if needed, through optical constellation 300 to a suitably located optical satellite 302, thereafter to a suitably located RF satellite 202, and then to a destination user terminal 102, which might be in communication with a data center 400.

In one embodiment, user terminals 102 will be installed at as many data centers as possible to ensure the majority of data traffic stays on the network of system 50, which would allow system 50 to better manage the customer experience.

Optical Layer Design

In one embodiment, the Optical Layer (constellation) 300 may be a mesh network system backplane. The optical satellites 302 may orbit in a Ballard Rosette orbit at a 57.5 degree inclination angle. The optical constellation 300 may include about 200 satellites that may be divided among ten planes, all at substantially the same inclination angle. There may be 20 satellites in each of the 10 planes. However, other, unequal distributions of the satellites among the various planes could be implemented. Preferably, each optical satellite 302 may communicate with four other optical satellites 302 and eight RF satellites 202.

FIG. 2 shows an example of US-Brazil and US-Africa optical links. Since free space optical communication is about 30% faster than communication through fiber-optic cable, embodiments of the present invention may be able to provide the lowest latency long-haul data communication network among all commercially available options. For example, simulations have shown that an embodiment of the present invention can reduce the Nairobi-MTV RTT (Round-Trip delay Time) latency from its current 245 ms to 140 ms.

The communication from one optical satellite 302 to another may initially be designed to operate at 10 Gbps per wavelength, which when using four wavelengths, provides a total data throughput of 40 Gbps. Communication over optical links between the optical satellites 302 and the RF satellites 202 may initially operate at a rate of 10 Gbps using a single, tunable wavelength. It is anticipated that the link speeds will increase over time with technology improvements and iterative system refreshes.

Spectrum

Figure 4A:
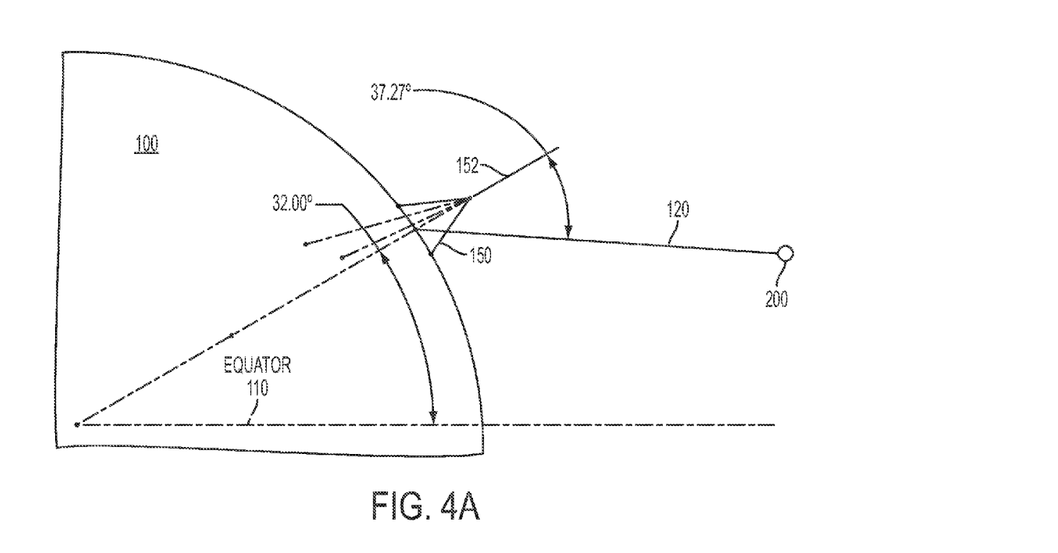
FIG. 4A is a schematic representation of a portion of a satellite orbit in proximity to the equator, in accordance with an embodiment of the present invention.
Figure 4B:
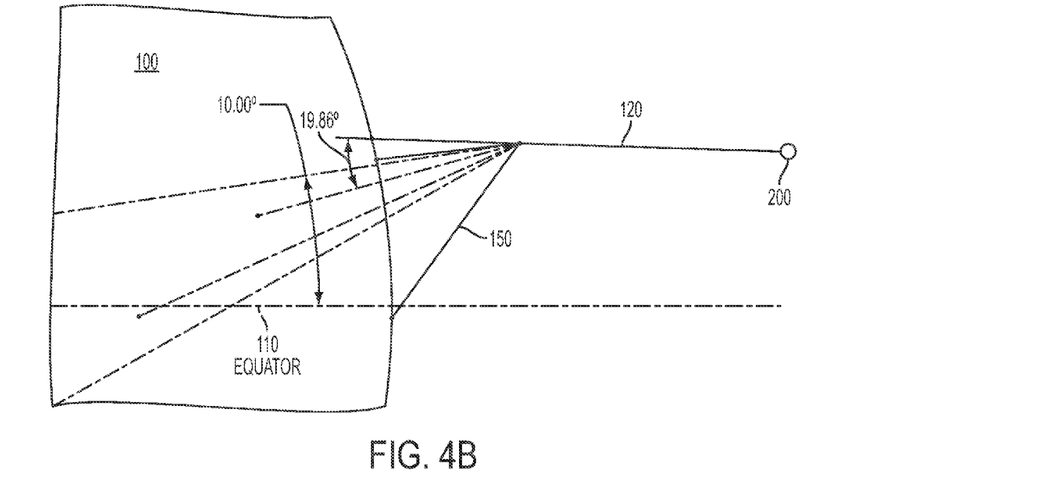
FIG. 4B is a schematic representation of a portion of a satellite orbit in proximity to the equator, in accordance with an embodiment of the present invention.

In one embodiment, 2.05 Ghz of Ku band Space-to-Earth and 1.5 Ghz Earth-to-Space, and 900/1075 Mhz of C band bandwidth may be employed. FIGS. 4A and 4B are schematic representations of portions of satellite 200 orbits in proximity to the equator 110, in accordance with an embodiment of the present invention. One embodiment of the present invention may communicate within a portion of the GSO spectrum by maintaining an angular separation from the GSO communication beam 152 to prevent interference. FIG. 4A shows GSO earth station 150 and its line of focus 152. Starting at a beam orientation about six degrees away from the GSO beam 152, non-GSO communication (i.e. beam 120) can be used without interfering with GSO communication. The amount of transmission power that can be used without interfering with GSO communication becomes progressively greater with increasing angular separation of the non-GSO beam 120 from the GSO beam 152. Once the separation angle (between the GSO beam and the non-GSO beam) is sufficiently large, the need to coordinate transmission schedules with GSO transmissions essentially disappears.

With reference to FIG. 4A, with a beam 32 degrees away from the equator 110, an embodiment of the system disclosed herein can maintain over 37 degrees of angular separation/isolation of RF satellite 200 beam 120 from the GSO communication beam 152, giving system 50 the ability to operate at very high power levels without incurring any risk of interference with GSO beam 152.

As the RF satellites 200 of system 50 approach the equator 110, the separation angle between the beams of satellites 200 and the GSO beam 152 declines, and we allow the satellites 200, 300 to tilt forward, while maintaining a 19-degree angular separation between the GSO and non-GSO beams, while still reaching the equator.

Figure 5:
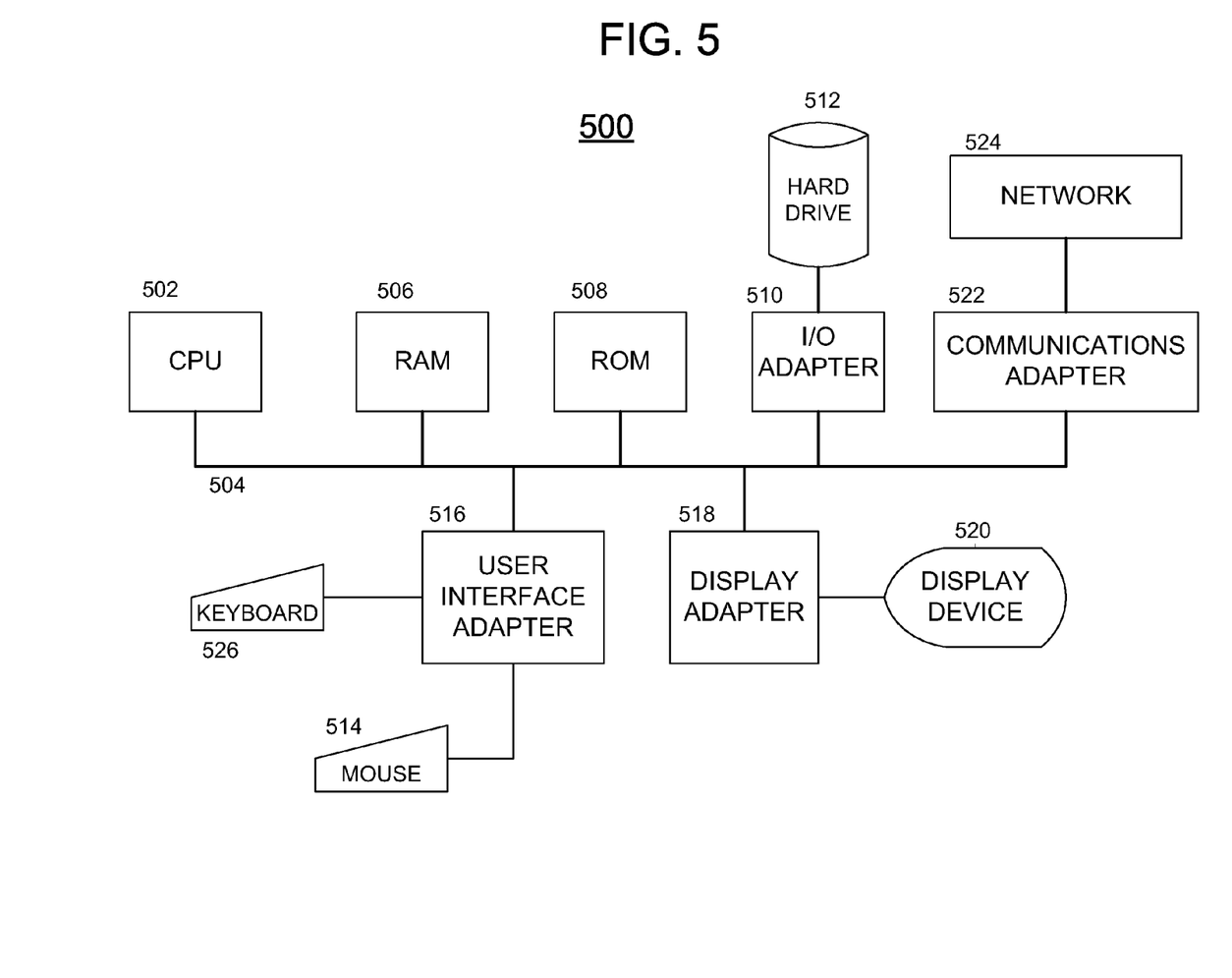
FIG. 5 is a block diagram of a computer system useable in conjunction with an embodiment of the present invention.

FIG. 5 is a block diagram of a computing system 500 adaptable for use with one or more embodiments of the present invention. For instance, a computing system incorporating one or more of the components (depicted with individual blocks in FIG. 5) of system 500 may be incorporated within one or more data centers 400. Moreover, computing systems incorporating one or more of the components of system 500 may be incorporated within any of user terminals 102, satellites 202 of the RF constellation 200, and/or satellites 302 of the optical constellation 300.

In computing system 500, central processing unit (CPU) 502 may be coupled to bus 504. In addition, bus 504 may be coupled to random access memory (RAM) 506, read only memory (ROM) 508, input/output (I/O) adapter 510, communications adapter 522, user interface adapter 506, and display adapter 518.

In an embodiment, RAM 506 and/or ROM 508 may hold user data, system data, and/or programs. I/O adapter 510 may connect storage devices, such as hard drive 512, a CD-ROM (not shown), or other mass storage device to computing system 500. Communications adapter 522 may couple computing system 500 to a local, wide-area, or global network 524. User interface adapter 516 may couple user input devices, such as keyboard 526, scanner 528 and/or pointing device 514, to computing system 500. Moreover, display adapter 518 may be driven by CPU 502 to control the display on display device 520. CPU 502 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A communication system, comprising:
    a first constellation of satellites traveling in an inclined orbit and operable to communicate with earth-based user terminals over respective radio frequency (RF) links;
    a processor operable to monitor separation angles between beams of said first constellation of satellites and a GSO beam and maintain each of the separation angles by at least a selected number of degrees by temporarily tilting at least some satellites in the first constellation of satellites to move the beams of the respective RF links away from the GSO beam to avoid an interference with the GSO beam without deviating from the inclined orbit; and
    a second constellation of satellites traveling in an inclined orbit at a higher altitude than the first constellation and operable to communicate with selected satellites in said first constellation over respective optical communication links.

2. The communication system of claim 1 wherein satellites in the first constellation orbit at an altitude between 600 and 950 kilometers (km).

3. The communication system of claim 1 wherein satellites in the second constellation orbit at an altitude of between 1100 and 1400 km.

4. The communication system of claim 1 wherein satellites in the second constellation travel along an orbit inclined at an angle between 35 degrees and 60 degrees.

5. The communication system of claim 1 wherein satellites in the first constellation travel along an orbit inclined at an angle between 60 degrees and 90 degrees.

6. The communication system of claim 1 wherein the first constellation includes between 200 and 1500 satellites.

7. The communication system of claim 1 wherein each satellite in the second constellation is able to communicate with at least two satellites in the second constellation and at least two satellites in the first constellation.

8. The communication system of claim 1 wherein each satellite in the first constellation comprises:
multiple RF ports for communication with earth-based user terminals.

9. The communication system of claim 1 wherein each satellite in the first constellation comprises:
at least two optical communication ports for communicating with one or more satellites in the second constellation.

10. The communication system of claim 1 wherein any satellite in the first constellation communicates with any other satellite in the first constellation using the satellites in the second constellation as communication intermediaries.

11. A communications system comprising:
a first satellite constellation in orbit around the earth and operable to communicate with a plurality of user terminals on the earth over radio frequency (RF) links;
a processor operable to monitor separation angles between beams of said first satellite constellation and a GSO beam and maintain each of the separation angles by at least a selected number of degrees by temporarily tilting at least some satellites in the first satellite constellation beams of the respective RF links away from the GSO beam to avoid an interference with the GSO beam; and
a second satellite constellation operable to provide a high-speed communication trunk line between a data-path origination satellite and a data-path destination satellite within said first satellite constellation.

12. The communications system claim 11 wherein a majority of a set of communications links between the first constellation and the second constellation are optical.

13. The communications system of claim 11 wherein a majority of a set of communication links between the satellites of the second constellation are primarily optical.

14. The communications system of claim 11 wherein a majority of the communication links between satellites in the second constellation and user terminals on the earth use radio frequency (RF) communication.

15. The communications system of claim 11 wherein the second constellation orbits at a higher altitude than the first constellation.

16. The communication system of 11 where the satellites of the first constellation include the ability to route traffic between two individual user terminals without passing the data traffic to a satellite in the second constellation.

17. A method for transmitting user data from an initial satellite in a first constellation to a destination satellite in the first constellation, the method comprising the steps of:
(a) transmitting the user data from the first-constellation initial satellite to a first satellite in a second constellation, the second constellation having a different orbit altitude than that of the first constellation, the first and second constellations both including a plurality of satellites and both having non-geostationary orbits;
(b) identifying a second satellite in the second constellation that is most suitable for communication with the first-constellation destination satellite;
(c) transmitting the user data from the first satellite in the second constellation to the identified second satellite in the second constellation;
(d) transmitting the user data from the second satellite in the second constellation to the first-constellation destination satellite; and
(e) monitoring separation angles between beams of said first constellation of satellites and a GSO beam and maintaining each of the separation angles by at least a selected number of degrees by temporarily tilting at least some satellites in the first constellation of satellites to move the beams of the respective RF links away from the GSO beam to avoid an interference with the GSO beam.

18. The method of claim 17 further comprising the steps of:
the first-constellation initial satellite receiving the user data from a first user terminal over a radio frequency (RF) link; and
transmitting the user data from the first-constellation destination satellite to a second user terminal.

19. The method of claim 17 wherein the step of
transmitting the user data from the first-constellation initial satellite to the first satellite in the second constellation is conducted over an optical communications link.

20. The method of claim 17 wherein the step of:
transmitting the user data from the first satellite in the second constellation to the identified second satellite in the second constellation is performed over an optical communications link.

21. The method of claim 17 further comprising:
directing satellites in the first constellation along an orbit having a first inclination angle; and
directing satellites in the second constellation along an orbit having a second inclination angle differing by least five degrees from the first inclination angle.

22. The method of claim 17 wherein said transmitting steps (a), (c), and (d) are operable to alleviate data traffic congestion in said first constellation.

23. A method for transmitting user data from an initial satellite in a first constellation located conveniently to an origination user terminal to a destination satellite in the first constellation located conveniently to a destination user terminal, the method comprising the steps of:
transmitting the user data over an optical link from the initial satellite in the first constellation to a first satellite within a second satellite constellation;
conveying the user data over an optical link from the first satellite in the second constellation to a second satellite in the second constellation;
receiving the user data from the second satellite in the second constellation at the destination satellite in the first constellation; and
monitoring separation angles between beams of said first constellation of satellites and a GSO beam and maintaining each of the separation angles by at least a selected number of degrees by temporarily tilting at least some satellites in the first constellation of satellites to move the beams of the respective RF links away from the GSO beam to avoid an interference with the GSO beam.

24. The method of claim 23 wherein all of the satellites are in non-geostationary orbits.

25. The method of claim 23 further comprising:
receiving the user data from the origination user terminal over a radio frequency (RF) link at an initial satellite within the first satellite constellation.

26. The method of claim 23 further comprising:
transmitting the user data from the destination satellite in the first constellation to the destination user terminal.

27. The method of claim 23 further comprising:
controlling communication at said initial and destination satellites in said first constellation and said first and second satellites in said second constellation using a data center on the earth.

28. The method of claim 23 wherein the steps of transmitting, conveying, and receiving correspond to using the second constellation as a space-based communications trunk line for said first constellation.

29. The method of claim 23 wherein the conveying step comprises:
transmitting the user data through a sequence of satellites within the second constellation located between the first and second satellites in the second constellation.

30. The method of claim 23 wherein the conveying step comprises:
transmitting the user data directly from the first satellite in the second constellation to the second satellite in the second constellation.

* * * * *